Patented Oct. 24, 1922.

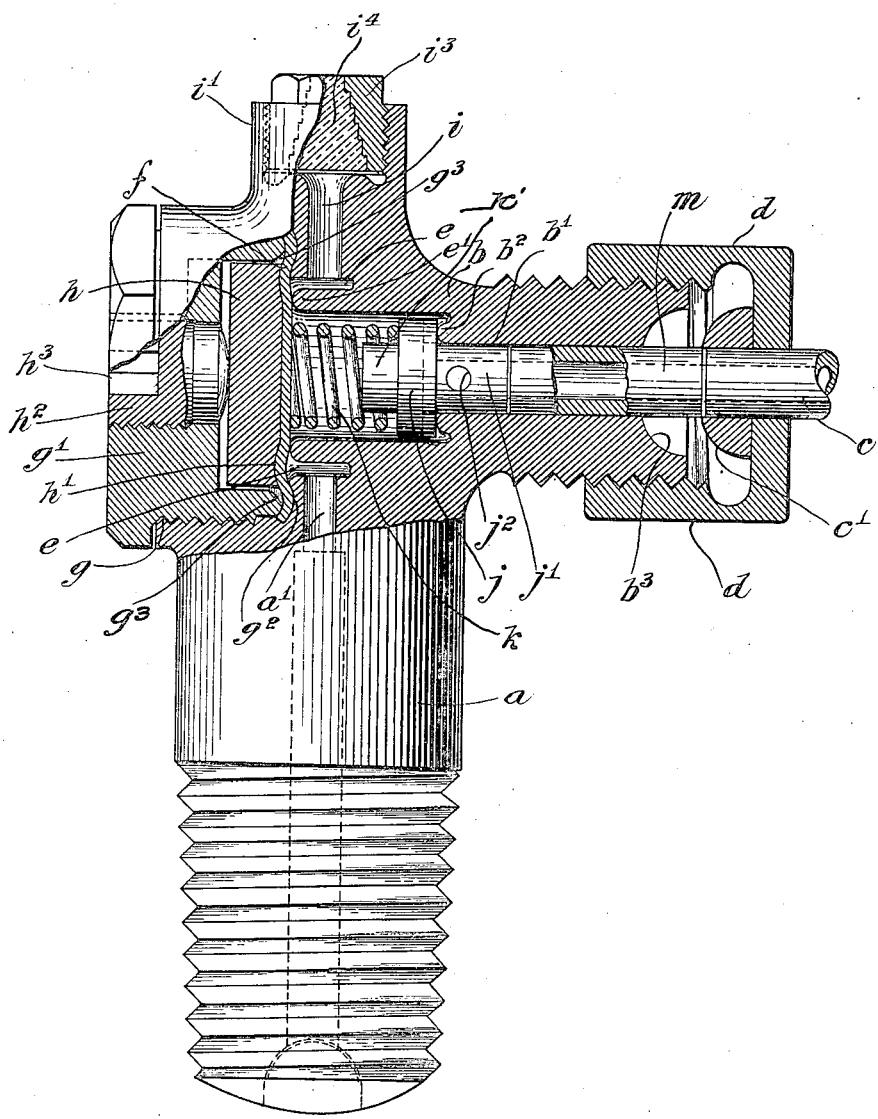

1,433,129

UNITED STATES PATENT OFFICE.

SVEN W. FRANSSON, OF JUTLAND, NEW JERSEY, ASSIGNOR TO SAMUEL TEPLITZ, OF NEW YORK, N. Y.

VALVE.

Application filed March 9, 1921. Serial No. 451,030.

*To all whom it may concern:*

Be it known that I, SVEN W. FRANSSON, a citizen of the United States, residing at Jutland, in the county of Hunterdon and State of New Jersey, have invented certain new and useful Improvements in Valves, of which the following is a specification, reference being had therein to the accompanying drawing, which forms a part thereof.

My invention relates to valves, and more particularly to a type of valve adapted for use with tanks adapted to contain gases under high pressure.

Heretofore with high pressure tanks, it has been a common practice to use a valve having a diaphragm gate co-operating with a narrow annular seat, the space within said seat communicating directly with the tank, and the outlet port being in communication with a shallow channel surrounding the seat. In this type of valve the gas under pressure within the tank has a considerable area of the diaphragm gate against which it may act, and unless the gate is closed tightly, there is always likelihood of leakage from the tank when not in use. Distortion of the diaphragm gate as a result of repeated flexure, sometimes tends to give a permanent distorted set thereto having a tendency to prevent the proper seating thereof. Furthermore, in this type of valve the flow of the gas from the tank is controlled solely by the actuation of the diaphragm gate, so that great care must be exercised to ensure the tight seating of the diaphragm gate both after the tank has been filled, and when it is desired to remove the service pipe from the nipple at the outlet port.

With these conditions in mind, I provide a valve particularly designed for use in connection with high pressure gas or liquid tanks having a primary and a secondary gate arranged in the passage between the tank, and the outlet port, the secondary valve gate being adapted to prevent the escape of the contents of the tank through the outlet port in the event of leakage at the primary valve gate.

The secondary valve gate is so arranged as to be seated under pressure from within the tank, while the pressure within the tank has a normal tendency to open the primary gate, when the valve stem is so actuated as to permit the opening of said gate under such pressure.

By thus providing a primary valve gate manually operative, and a secondary valve gate arranged in the gas passage between said primary gate and the outlet port, I secure a high factor of safety in the storage of tanks when same are not in use, as with this double valve gate structure the likelihood of the escape of gases, dangerous either by reason of the fire hazard attendant upon such escape, or the poisonous nature of the gases within the tank, is reduced to a minimum.

The secondary valve gate is so constructed and arranged in relation to the outlet port that the application of a service pipe thereto will automatically open said gate and hold it open so long as said pipe remains so attached, the construction being such, however, that with the removal of said service pipe, said gate will automatically close, thus preventing the escape of gases even though, before the removal of said pipe, the primary valve is not properly closed.

Furthermore, the secondary valve is operatively connected with the primary valve in a manner to supplement the action of the gases under pressure, in opening said valve, thus ensuring a substantially complete discharge of the entire contents of the tank notwithstanding a drop of pressure within said tank as a result of the gradual flow of the gases therefrom.

The gate construction of the valve is such that either gate may be opened and closed entirely independently of the other.

A valve made in accordance with my invention may be used in either charging or discharging the tank.

The invention consists primarily in a valve embodying therein a casing having a continuous passage therethrough provided with an intake and an outlet, a primary valve and a secondary valve arranged at different points of said passage, manually operative means whereby said primary valve may be actuated, automatically acting means having a normal tendency to close said secondary valve, and means detachable in relation to, and operative in opposition to said automatically acting means upon, said secondary valve, whereby said secondary valve may be opened and held open independently of said primary valve, but will automatically close upon the removal of said detachable means therefrom; and in such other novel features of construction and combination of parts as are hereinafter set forth and described, and more particularly pointed out in the claims hereto appended.

In the accompanying drawings, I have shown, partly in elevation and partly in section, a valve structure embodying my invention.

In the embodiment of the invention shown in the drawings, I employ a valve casing having an exteriorly screw-threaded lead $a$ by means of which the valve may be attached to a high pressure tank, not shown, and a second lead $b$ also exteriorly screw-threaded, to permit the connection of a service pipe $c$ therewith by means of an ordinary union $d$. The leads $a$ and $b$ are angularly arranged with relation to each other, the angle shown in the drawings being 90°, which is preferable because of ease of manufacture and the possibility of greater precision in the finishing of the different valve seats.

Extending axially of the two leads of the casing is a continuous passage formed of the bore $a'$ in the lead $a$, the bore $b'$ of the lead $b$ and an annular chamber $e$ with which the bore $a'$ is in constant communication, and with which the bore $b'$ is adapted to communicate across an annular valve seat $e'$ disposed between said chamber and said bore $b'$. The seat $e'$ is preferably rounded or otherwise reduced at the point of operative engagement of the co-operating valve gate $f$ therewith to secure a more effective joint when the valve is closed.

The casing adjacent the valve seat $e'$ and chamber $e$ is enlarged as shown at $g$, and is interiorly screw-threaded to receive a gland nut $g'$ adapted to engage the diaphragm valve gate $f$ about and adjacent the periphery thereof so as to seat the periphery of said gate firmly against the curved seat $g^2$ and form a fluid tight joint about the edge of said gate. By curving the seat $g^2$ and reducing the outer edge of the nut $g'$, the gate $f$ receives a distorted set, in addition to an extended bearing surface, which affords a sufficiently tightly packed joint at this point. The inner edge of the gland nut is chamfered as shown at $g^3$ to permit a free flexure of the valve gate $f$ in opening and closing the valve.

Slidably mounted in the recess of the nut $g'$ is a block $h$ adapted to bear upon the gate $f$ throughout the area thereof above the bore $b'$, chamber $e$, seat $e'$ and the inner edge of the seat $g^2$, said block having a slight arched depression $h'$ intermediate said seats.

Carried by the nut $g'$ is a screw plug $h^2$, the inner rounded end of which engages the block $h$ and the outer end of which has a key socket $h^3$ or other means by which said plug may be turned to seat the valve gate $f$, or permits its flexure under pressure of the fluid in the annular chamber $e$ in a manner to permit such fluid to flow from said chamber across the seat $e'$ to the bore $b'$.

Leading from the chamber $e$ is a blow-off port $i$ formed in a nipple $i'$, said port being normally closed by the screw plug $i^3$ formed in part of a fusible metal $i^4$. This construction is for the purpose of automatically emptying a tank through the valve in the event of fire in order to avoid danger resulting from explosion due to the development of excessive pressure of the fluid in the tank.

While the structure heretofore described is reasonably effective in use, it has the disadvantages that the valve gate $f$ is opened solely by the application of pressure from the fluid within the tank. If this pressure be applied centrally of said gate, it has a large area upon which to act, and there is always likelihood of a minute flexure of the gate either through a failure to properly seat the gate or lost motion resulting from wear on the threads of the plug $h^2$. Furthermore, a material drop of pressure in the tank will permit a reflex action of the gate and thus reduce the flow of fluid under conditions when the capacity of the valve should be greatest. While the use of a thin gauge valve gate which will flex under light pressures, would tend to offset the partial closing of the valve with a drop of pressure, fairly heavy gauge stock is required to minimize likelihood of the breakage of the gate, undue wear thereon, or such permanent distortion as would result in leakage about the seat $e'$.

By limiting the dimensions of the chamber $e$ and distorting the gate $f$ in the manner shown, so as to facilitate its flexure under fluid pressure when the block $h$ is relieved from pressure from the plug $h^2$, I am enabled to partially overcome the tendency of the valve to close with a drop of pressure, and minimize likelihood of leakage from the causes above referred to.

While the gate $f$ and its related parts, which I have for convenience of expression termed the primary valve, will under most conditions be fluid tight when closed, I provide a secondary valve which, when the tank is not in use, as during storage or transportation, will prevent any leakage into atmosphere in the event of a partial or complete failure of the primary valve. Furthermore, this secondary valve is so controlled that it will be opened by the application of a service pipe to the valve structure, and will be automatically closed upon the removal of said pipe by means acting upon the gates of both the primary and the secondary valve, and having a normal tendency to unseat the former and seat the latter gate. By this construction, the two valves are capable of being opened or closed entirely independently one of the other, but when both valves are opened, said means will prevent reflex action of the gate $f$ and thus prevent its partial seating with a drop of pressure in the tank.

This secondary valve comprises a block $j$ having a reduced hollow stem $j'$ slidably mounted in the bore $b'$ of the lead $b$, and having a port $j^2$ through which the fluid may flow from said bore to within said stem upon the opening of the valve. The bore $b'$ is enlarged adjacent the valve seat $e'$ and has an annular valve seat $b^2$ co-operating with the block $j$.

Seated between the valve block $j$ and the gate $f$ and bearing upon both is a coiled spring $k$ which has a normal tendency to open the primary valve and to close the secondary valve. Said spring encircles the stud $k'$ upon the valve block $j$.

The valve block $j$ is provided with suitable packing, indicated in dotted lines in the drawings.

The outlet of the bore $b'$ is enlarged as shown at $b^3$, forming a hemispherical chamber adapted to receive a nipple $c'$ of corresponding contour carried by the service pipe $c$ and forming a knob about which the union $d$ swivels. Said nipple forms a metal to metal seal when the service pipe is applied to the casing.

As an additional factor of safety, I employ a short pipe section $m$ removably mounted in the bore $b'$, which is of a length to engage the stem $j'$ and be engaged by the nipple $c'$ so that the unseating of the valve $j$ by the service pipe, or accidentally, may be prevented by removing said pipe section.

One end of the bore $a'$ opens into the chamber $e$ and the other or inlet end, opens within the tank not shown.

The operation of the herein described valve mechanism is substantially as follows:—

In the drawings the various parts are shown in the fully closed position, the service pipe and its union being shown in position ready for application to the valve casing. During storage or transportation, the union $d$ and pipe $c$ will be removed from the lead $b$ and the pipe section $m$ withdrawn from the bore $b'$ so as to prevent a possible unseating of the valve block $j$ because of the inaccessibility of the stem $j'$.

Under these conditions, there is afforded a double sealing of the passage $a'$—$e$—$b'$, so that if any fluid should escape past the valve gate $f$, it will accumulate between said seat and the block $j$. Should the volume of escaping fluid be sufficient to develop any substantial pressure in the enlarged portion of the bore $b'$, this pressure will merely supplement the action of the spring $k$ in firmly seating the valve block $j$. Hence fluid escaping by the primary valve as the result of leakage, will be confined within the valve casing by the secondary valve. If, through any cause, the gate $f$ should be left fully opened or only partially closed the valve block $g$ and its co-operating parts would in like manner prevent the escape of the fluid into the atmosphere when it would become a danger factor, either by reason of its inflammable, or its poisonous, nature.

In the event of fire, when the resultant danger would be a possible explosion, the fuse plug $i^4$ will melt and permit the escape of the fluid even though both the primary and the secondary valves be properly closed.

When it is desired to withdraw the fluid from the tank, the pipe section $m$ is inserted in the bore $b'$ and the service pipe $c$ applied to the lead $b$ by tightening the union $d$. As shown in the drawings, the co-acting threads of the union are well engaged before any opening movement is imparted to the valve block $j$.

With continued tightening of the union, the block $j$ will be moved from its seat $b^2$ against the tension of the spring $k$ until the port $b^2$ is exposed within the enlarged portion of the bore $b'$.

When the parts are so set, the screw plug $h^2$ may be withdrawn in a manner to permit the block $h$ to recede within the chamber in the nut $g'$, thus affording clearance for the flexure of the diaphragm gate $f$ under the influence of the fluid under pressure in the chamber $e$, and the tension of the spring $k$.

If desired the primary valve may be opened prior to the final tightening of the union and the resultant opening of the secondary valve, although I consider the former mode of operation better practice.

In shutting off the valve the practice is the reverse of that described, it being necessary to use the primary valve alone, if the service pipe is to remain in position.

The spring $k$ when fully tensioned by the opening of the secondary valve, has sufficient strength to flex the gate $f$ or maintain it flexed, so that only a small area of application of fluid pressure to said gate is required.

When drawing fluid from a tank, the spring $k$ will ensure the gate $f$ being held open to the full extent, irrespective of pressure conditions in the tank.

A valve made in accordance with my invention is especially adapted for use on tanks for hydrogen, oxygen, carbon-dioxid and other gases, which gases are usually stored in the tank under very high pressure.

While I have described the use of the valve in withdrawing fluids from a tank, it is apparent that it will be equally effective and operate in the same manner when a tank is filled therethrough.

It is not my intention to limit the invention to the precise details of construction shown in the drawings, it being apparent that such may be varied without departing from the spirit and scope of the invention.

Having described the invention, what I claim as new and desire to have protected by Letters Patent, is:—

1. A valve embodying therein a casing having a continuous passage therethrough having an inlet adapted to communicate with a high pressure tank, and an outlet, a primary valve and a secondary valve arranged at different points of said passage, manually operative means controlling the opening and closing of said primary valve, automatically acting means having a normal tendency to close said secondary valve, and means detachable in relation to, and opposed to the action of said automatically acting means upon, said secondary valve, whereby said secondary valve may be opened and held open, independently of said primary valve, and will automatically close upon the detachment of said means.

2. A valve embodying therein a casing having a continuous passage therethrough having an inlet adapted to communicate with a high pressure tank, and an outlet adapted to be connected with a service pipe, a primary valve adapted to control the flow of fluid through said passage and to be subjected to opening pressure from the fluid in a tank, a secondary valve arranged in said passage intermediate said primary valve and said outlet and adapted to be held closed by fluid pressure from the tank, automatically acting means operative upon said secondary valve and having a normal tendency to close same, a service pipe, means whereby said pipe may be detachably connected with said casing adjacent said outlet, and means carried by said service pipe adapted to operatively engage said secondary valve in opposition to said automatically acting means, whereby upon the connection of said pipe with said casing, said secondary valve will be opened and held open, and upon the disconnection of said pipe, said secondary valve will automatically close.

3. A valve embodying therein a casing having two angularly arranged leads each having a bore therethrough, the bore of one of said leads having an inlet adapted to communicate with a high pressure tank, and the bore in the other of said leads having an outlet adapted to communicate with a service pipe, said casing having an annular chamber into which the other end of said first named bore opens, an annular valve seat intermediate said chamber and the bore of said other lead whereby a continuous passage is formed between said inlet and said outlet, a diaphragm valve gate co-operating with said valve seat, means sealing said gate adjacent the edge thereof, means whereby said gate may be controlled, a valve seat in said other lead, a reciprocatory valve block co-operating therewith, automatically acting means operative upon said block and having a normal tendency to close same, and means detachable in relation to said other lead, and opposed to the action of said automatically acting means, whereby said valve block may be unseated and held unseated independently of the action of said diaphragm gate, and will be automatically seated upon the detachment of said last named means.

4. A valve embodying therein a casing having a continuous passage therethrough having an inlet adapted to communicate with a high pressure tank, and an outlet, a primary valve and a secondary valve arranged at different points of said passage, manually operative means controlling the opening and closing of said primary valve, automatically acting means operative upon both of said valves with a normal tendency to open said primary valve and close said secondary valve, and means detachable in relation to said secondary valve and operative thereon to open said valve in opposition to said automatically acting means, whereby said secondary valve may be opened and held open independently of said primary valve, and will automatically close upon the removal of said detachable means, and said primary valve will be held open irrespective of pressure conditions in a tank, and may be opened and closed independently of said secondary valve.

5. A valve embodying therein a casing having two angularly arranged leads each having a bore therethrough, the bore of one of said leads having an inlet adapted to communicate with a high pressure tank, and the bore in the other of said leads having an outlet adapted to communicate with a service pipe, said casing having an annular chamber into which the other end of said first named bore opens, an annular valve seat intermediate said chamber and the bore of said other lead whereby a continuous passage is formed between said inlet and said outlet, a diaphragm valve gate co-operating with said valve seat, means sealing said gate adjacent the edge thereof, means whereby said gate may be controlled, a valve seat in said other lead, a reciprocatory valve block cooperating therewith, automatically acting means acting between said diaphragm gate and said block with a normal tendency to open the former and close the latter, and means detachable in relation to said other lead and adapted to unseat said valve block in opposition to said automatically acting means, whereby said valve block may be unseated and held unseated independently of movement of said diaphragm gate, and will be automatically seated upon the removal of said detachable means, and said diaphragm valve will be held unseated irrespective of pressure conditions in a tank, and may be seated and unseated independently of said block.

6. A valve embodying therein a casing having two angularly arranged leads each having a bore therethrough, the bore of one of said leads having an inlet adapted to communicate with a high pressure tank, and the bore in the other of said leads having an outlet adapted to communicate with a service pipe, said casing having an annular chamber into which the other end of said first named bore opens, an annular valve seat intermediate said chamber and the bore of said other lead whereby a continuous passage is formed between said inlet and said outlet, a diaphragm valve gate co-operating with said valve seat, means sealing said gate adjacent the edge thereof, means whereby said gate may be controlled, a valve seat in said other lead, a reciprocatory valve block co-operating therewith, automatically acting means operative upon said block and having a normal tendency to close same, the stem of said valve block being hollow and having a port through the side thereof slidably mounted in the bore of said other lead, a short pipe section removably mounted in said bore adjacent the outlet thereof, a service pipe, a nipple thereon adapted to engage said pipe section, and a screw-threaded union between said service pipe and said other lead, whereby said nipple, when said union is threaded on said lead, will impart longitudinal movement to said pipe section and unseat said valve block and hold it unseated, and said valve block will be automatically opened, and the removal of said pipe section permitted, upon the separation of said union, seating and unseating of said block being independent of the actuation of said diaphragm gate.

7. A valve embodying therein a casing having a continuous passage therethrough having an inlet adapted to communicate with a high pressure tank, and an outlet, a primary valve and a secondary valve arranged at different points of said passage, manually operative means controlling the opening and closing of said primary valve, automatically acting means having a normal tendency to close said secondary valve, means removably mounted in said passage and adapted to operatively engage said secondary valve and means detachable in relation to said casing and operative in opposition to said automatically acting means through said removable means, whereby said secondary valve may be opened, and held open, independently of said primary valve, and will automatically close upon the detachment of said last named means, and be prevented from actuation.

8. A valve embodying therein a casing having two angularly arranged leads each having a bore therethrough, the bore of one of said leads having an inlet adapted to communicate with a high pressure tank, and the bore in the other of said leads having an outlet adapted to communicate with a service pipe, said casing having an annular chamber into which the other end of said first named bore opens, an annular valve seat intermediate said chamber and the bore of said other lead whereby a continuous passage is formed between said inlet and said outlet, a diaphragm valve gate co-operating with said valve seat, a depressed curved seat adapted to receive said gate adjacent the periphery thereof, a gland nut adapted to clamp said gate against said seat, the inner edge of said gland nut being chamfered, a reciprocatory block within said gland nut, a screw plug carried by said gland nut and engaging said diaphragm gate, said reciprocatory block having an annular depression therein extending across said chamber, a valve seat in said other lead, a reciprocatory valve block co-operating therewith, automatically acting means operative upon said block and having a normal tendency to close same, and means detachable in relation to said other lead, and opposed to the action of said automatically acting means, whereby said valve block may be unseated and held unseated independently of the action of said diaphragm gate, and will be automatically seated upon the detachment of said last named means.

9. A valve embodying therein a casing having a continuous passage therethrough having an inlet adapted to communicate with a high pressure tank, and an outlet, a primary valve and a secondary valve arranged at different points of said passage, manually operative means controlling the opening and closing of said primary valve, automatically acting means having a normal tendency to close said secondary valve, means detachable in relation to, and opposed to the action of said automatically acting means upon, said secondary valve, whereby said secondary valve may be opened and held open, independently of said primary valve, and will automatically close upon the detachment of said means, said casing having a blow-out port therein communicating with said passage intermediate said primary valve and the inlet of said passage, and a plug containing fusible metal closing said port.

10. A valve embodying therein a casing having two angularly arranged leads each having a bore therethrough, the bore of one of said leads having an inlet adapted to communicate with a high pressure tank, and the bore in the other of said leads having an outlet adapted to communicate with a service pipe, said casing having an annular chamber into which the other end of said first named bore opens, an annular valve seat intermediate said chamber and the bore of said other lead whereby a continuous passage is formed between said inlet and said outlet, a diaphragm valve gate co-operating with said valve seat, means sealing said gate adjacent the edge thereof, means whereby said gate may be controlled, a valve seat in said other lead, a reciprocatory valve block co-operating therewith, automatically acting means operative upon said block and having a normal tendency to close same, means detachable in relation to said other lead, and opposed to the action of said automatically acting means, whereby said valve block may be unseated and held unseated independently of the action of said diaphragm gate, and will be automatically seated upon the detachment of said last named means, said casing having a blow-out port leading from said annular chamber, and a plug containing fusible metal closing said port.

In witness whereof I have hereunto affixed my signature, in the presence of two subscribing witnesses, this 2nd day of March, 1921.

SVEN W. FRANSSON.

Witnesses:
F. T. WENTWORTH,
FRIEDA KOEHLER.